Patented Apr. 14, 1936

2,037,656

UNITED STATES PATENT OFFICE 2,037,656

SPRAY MATERIAL

John W. Roberts, Washington, D. C., dedicated to the free use of the Government and the People of the United States No Drawing. Application September 16, 1932, Serial No. 633,465

1 Claim. (Cl. 167—14)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate the same to the free use of the Government and the People of the United States.

In my patent (No. 1,791,430), a mixture of zinc sulphate and lime, to which other substances may be added to increase sticking and spreading properties, is described. This fungicide and bactericide, hereafter designated zinc-lime, is successfully used for protecting plants from the attacks of certain parasitic organisms. It may also be applied to plants as a parasiticide in combination with other parasiticides such as lead arsenate, nicotine compounds, and mixtures containing elemental sulphur. In such mixtures, there being little if any chemical combination, the parasiticidal properties of the various components of the mixture remain unchanged and are essentially the same as if the various components were applied separately. The advantage to the user is a saving in time and money by applying for different purposes various parasiticides suspended in the same fluid or mixed together dry and applied as a dust. As will hereafter be seen, there is a further unique advantage in the mixture of zinc-lime with other parasiticides.

My new invention pertains to improvements in and novel uses for the zinc-lime spray as follows:

When combined with the calcium polysulphides which, together with other compounds of calcium and sulphur are commonly known as lime sulphur, a compound or mixture of compounds is formed possessing parasiticidal properties superior to those of zinc-lime alone and approximately equal to those of the lime sulphur. In addition the combination or mixture is markedly less injurious to plants than is the lime sulphur used separately, approximating in this respect the noninjurious properties of the zinc-lime mixture when used separately. The combination of zinc-lime with lime sulphur may also be mixed with insecticides such as lead arsenate and the mixture applied simultaneously without injury to the effectiveness of either the zinc-lime and lime-sulphur mixture or the insecticide.

For example, zinc-lime may be prepared by mixing 4 lbs. of zinc sulphate (white vitriol) with 4 lbs. of hydrated lime (calcium hydroxide) in 50 gallons of water. Then 1¼ gallons of lime-sulphur solution testing 33° Baumé may be added. If desired, arsenate of lead at the usual strength may be added for the control of certain insect pests. The above-described mixture in fluid form when sprayed upon plants causes no injury and is toxic to parisitic organisms.

The quantities of the ingredients in the above-described compounds or mixture of compounds may be varied as conditions demand. The ingredients may also be mixed and applied in dry form, the diluent being hydrated lime (calcium hydroxide) or inert materials such as talc.

Furthermore, colloidal materials such as casein, glue, or colloidal clay, may be added for the purpose of increasing the adhesive or spreading properties of any of these compounds or mixtures of compounds thus adding to their effectiveness as parasiticides when applied to plants in either liquid or dry form.

I claim:

A parasiticidal preparation, comprising the complex products of the reaction between zinc-lime, and lime-sulphur.

JOHN W. ROBERTS.